United States Patent [19]

Plunkett

[11] Patent Number: 4,814,677

[45] Date of Patent: Mar. 21, 1989

[54] FIELD ORIENTATION CONTROL OF A PERMANENT MAGNET MOTOR

[75] Inventor: Allan B. Plunkett, Portland, Oreg.

[73] Assignee: General Electric Company, Schenectady, N.Y.

[21] Appl. No.: 132,840

[22] Filed: Dec. 14, 1987

[51] Int. Cl.$^4$ .............................................. H02P 6/00
[52] U.S. Cl. ..................................... 318/254; 318/138
[58] Field of Search ...................... 318/138, 254, 439; 310/156

[56] References Cited

U.S. PATENT DOCUMENTS

| | | | |
|---|---|---|---|
| 3,383,574 | 5/1968 | Manteuffel | 318/254 |
| 3,706,924 | 12/1972 | Adler | 318/254 |
| 4,005,347 | 1/1977 | Erdman | 318/254 |
| 4,245,181 | 1/1981 | Plunkett | 318/805 |
| 4,282,473 | 8/1981 | Dreiseitl et al. | 318/803 |
| 4,327,302 | 4/1982 | Hershberger | 310/156 |
| 4,388,577 | 6/1983 | Blaschke et al. | 318/717 |
| 4,390,826 | 6/1983 | Erdman et al. | 318/439 |
| 4,486,679 | 12/1984 | Jones | 310/218 |
| 4,629,921 | 12/1986 | Gamletz | 310/156 |
| 4,642,537 | 2/1987 | Young | 318/254 |
| 4,654,566 | 3/1987 | Erdman | 318/254 |
| 4,677,360 | 6/1987 | Garces | 318/803 |
| 4,698,577 | 1/1981 | Seymour et al. | 318/805 |

OTHER PUBLICATIONS

Bose, B. K., "A High Performance Inverter-Fed Drive System of an Interior Permanent Magnet Synchronous Machine", Conference Record of 1987 *IEEE Industrial Applications Society Meeting*, pp. 269–276.

Jahns, T. M., et al., "Interior Permanent-Magnet Synchronous Motors for Adjustable-Speed Drives", *IEEE Transactions on Industry Applications*, vol. IA-22, No. 4, Jul./Aug. 1986, pp. 738–747.

Primary Examiner—Bentsu Ro
Attorney, Agent, or Firm—Marvin Snyder; James C. Davis, Jr.

[57] ABSTRACT

A field orientation control system for an interior permanent magnet synchronous motor includes function generating means responsive to a torque command signal for producing direct and quadrature axis direct current signals which are converted to synchronously-varying two-phase signals for coupling to power control means, for effecting sinusoidal energization of the permanent magnet motor. The function generators modify the torque command signal as a predetermined function of the motor parameters. Rotor position information is derived from measured stator voltages and currents without the use of a separate rotor position sensor. The control system includes means for establishing a preselected amplitude of a stator $\alpha$-axis current in the motor at start-up prior to establishing orthogonal $\beta$-axis current such that the motor rotor is caused to become initially aligned with the selected $\alpha$-axis.

9 Claims, 8 Drawing Sheets

FIELD ORIENTATION CONTROL OF A PERMANENT MAGNET MOTOR

The present invention relates to motor control systems and, more particularly, to phase angle or vector control of a permanent magnet motor.

BACKGROUND OF THE INVENTION

In electromechanical systems requiring fast response and four quadrant operation with good performance near zero speed, an electrical machine must essentially provide controlled torque over a wide range of operating conditions. Historically, a separately excited direct current (DC) motor has been the primary machine type employed in such situations. The proportional relationship between motor armature current and motor torque provides a direct means of achieving torque control. Use of high frequency DC choppers with current feedback provides direct control of current and overcomes the problem of speed dependence caused by the armature circuit counter emf. Excellent torque control can be achieved until the counter emf becomes comparable to the chopper input voltage. Field weakening is also available to allow operation in the high speed, constant HP range.

Developments in the theory of controlling alternating current (AC) machines coupled with technological developments in power switching systems and control electronics now provide capability for achieving controlled torque operation of AC machines. As in the DC machine, torque control is obtained by controlling the motor current. In the AC machine, however, this control must be in terms of both amplitude and phase, which has led to the generic term "vector control". In addition, unlike the DC machine where orientation of field flux and armature mmf is fixed by the commutator and brushes, the AC machine requires external control of the field flux and armature mmf spatial orientation. Without such control, phase angles between the various fields in an AC machine vary with load (and during transients) giving rise to complex interactions and oscillatory dynamic response. Control systems for AC machines which directly control these space angles have come to be called "field orientation" or "phase angle" or "vector" controllers. The term "field orientation" generally means a system which attempts to produce a 90° space angle between specifically chosen field components (currents and/or fluxes) so as to closely emulate a DC machine.

High frequency chopping and current feedback are used to obtain current control and overcome the speed dependent counter emf in field orientation control of an AC machine. A pulse width modulated (PWM) inverter with current loop control has been the controller of choice, although voltage control is feasible and other types of inverters are often used.

Notwithstanding the improvement in operating characteristics of the AC machine using such phase angle or field orientation controllers, the desire to provide a machine having the advantageous characteristics of the DC machine has led to development of a brushless DC machine and, more particularly, to a permanent magnet DC machine, hereinafter referred to as an electronically commutated motor or ECM. In the ECM, there are provided multiple field windings which are energizable in a selectable sequence to establish a rotating magnetic field. A rotor, constructed of permanent magnets, has a substantially constant magnetic flux orientation which interacts with the rotating magnetic flux field of the field windings to effect rotation of the rotor. A more detailed description of an ECM may be had by reference to U.S. Pat. No. 4,005,347 to Erdman issued Jan. 25, 1977 and assigned to the assignee of the present application.

Control systems developed for the ECM have generally been PWM inverter systems using either square-wave current or voltage control to regulate motor torque. These systems typically require rotor position sensors to inform the control electronics of the instantaneous rotor position to insure proper energization patterns for the stator windings to produce rotation. Such rotor position sensors (e.g., encoders, resolvers, Hall effect devices) are undesirable because of their cost, volume and susceptibility to damage and failure. Alternatively, it is possible to eliminate the need for these sensors by measuring the back emf voltages generated by the spinning rotor magnets to determine rotor position. An exemplary control system of this latter type is disclosed in U.S. Pat. No. 4,654,566 to Erdman, issued Mar. 31, 1987 and assigned to the assignee of the present invention.

While the ECM using the aforementioned PWM control techniques has resulted in an electromechanical system which combines many of the characteristic advantages of the DC machine with the low maintenance and high speed capability of the AC machine, it is desirable to achieve similar performance characteristics in other types of permanent magnet machines which are supplied with sinusoidal voltage or current excitation instead of square-wave excitation.

Figure 2:
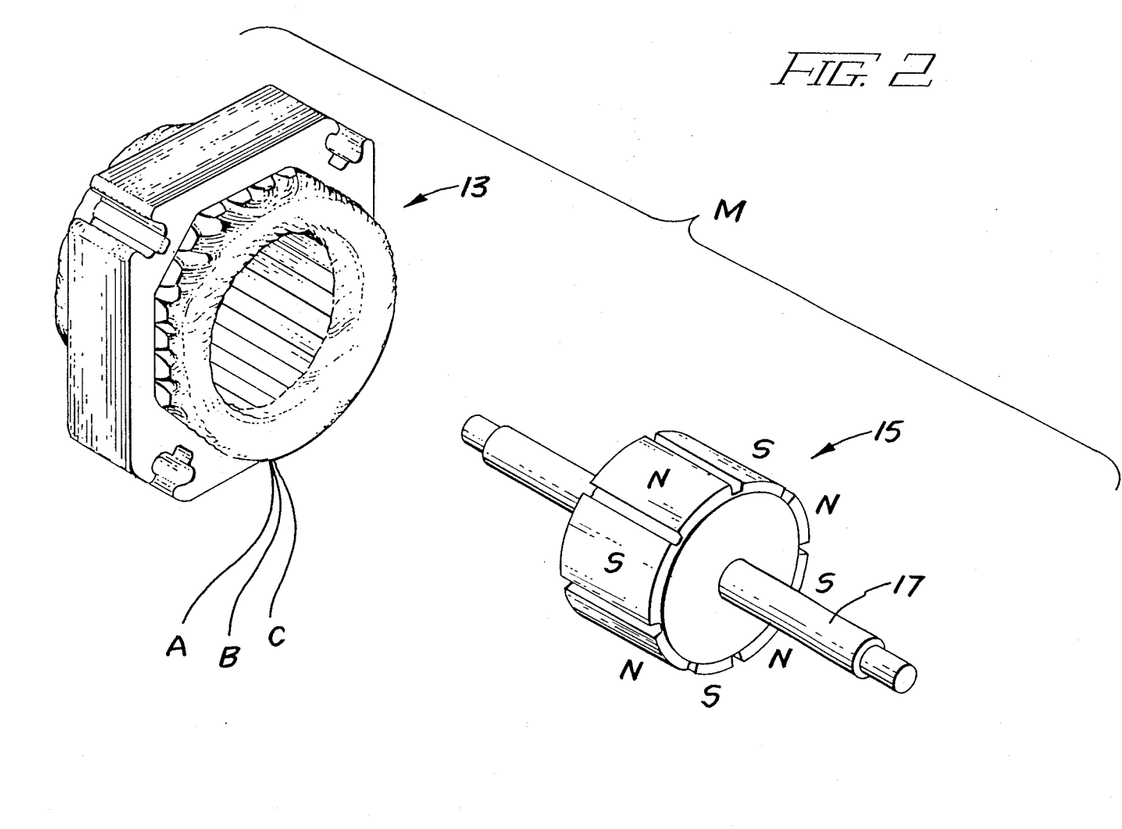
FIG. 2 is an exploded, perspective view of the main elements of a surface permanent magnet motor.
Figure 3:
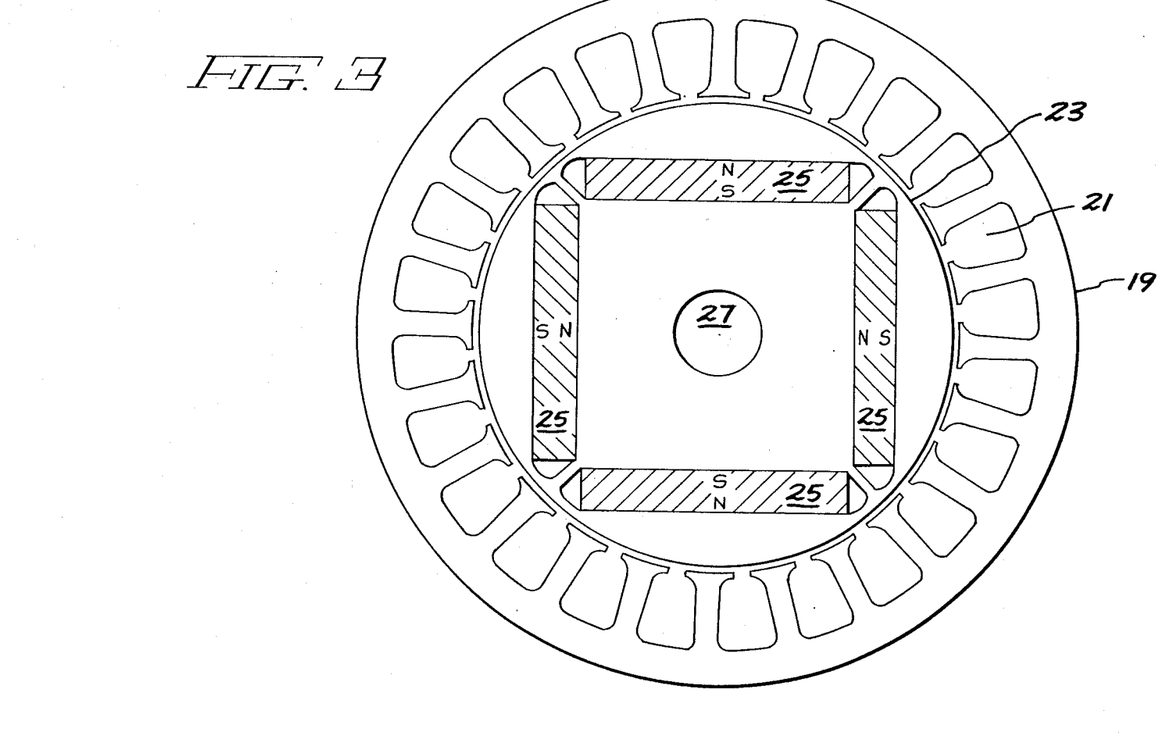
FIG. 3 is a cross section view showing laminations, with permanent magnets in place, of an interior permanent magnet motor which is controllable by the control system of the present invention.
Figure 3A:
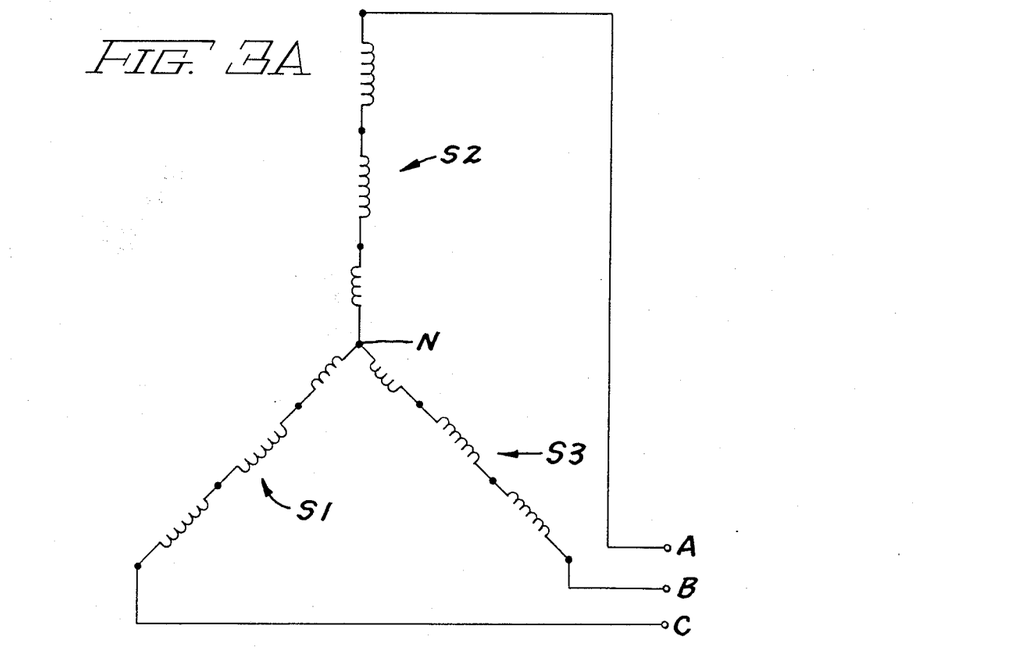
FIG. 3A is a schematic diagram showing the winding stages and terminals of the motor of FIGS. 2 or 3.

FIG. 2 is a perspective view of one form of ECM or permanent magnet (PM) motor M with multiple stator windings. As illustrated, the rotor is removed from the stator. An illustrative three-phase winding for motor M is shown in FIG. 3A. Rotor 15 is constructed with alternating magnetic polarity magnets shown in what is sometimes referred to as a surface-magnet construction. While this construction is very simple and well known, it is also possible to construct such rotors in what is known as "interior magnet" form to create an interior permanent magnet (IPM) motor. As shown in FIG. 3, the magnets in the IPM motor are mounted below the rotor surface and overlaid with a magnetic material which serves to protect the magnets and strengthen the rotor. While this provides an improved structure, it creates special control problems in that the magnetic material is susceptible to induced magnetic flux fields from the motor stator winding currents. Furthermore, the IPM motor requires sinusoidal excitation for smooth torque production. Thus operation of this type of sinusoidally-excited PM machine without a rotor position sensor produces special control problems since the back-EMF cannot be directly detected at the motor terminals as in a square-wave ECM drive due to the inducted magnetic flux from the stator current causing an addition to the back EMF.

The sinusoidally-excited permanent magnet motor also demonstrates a start-up problem not experienced in field orientation control of AC induction motors if there is no position sensor. In an AC induction motor, the magnetic flux in the rotor can be initially established in an arbitrary orientation by excitation of the stator windings with a current of predetermined orientation. The rotor of the induction motor is symmetrical about its axis so that there is no preferred rotor excitation at startup. In the permanent magnet motor, the permanent magnets establish a fixed orientation for the rotor field excitation flux. The applied stator current must be properly oriented with respect to the rotor magnets to generate torque. This poses a problem since orientation of the magnets is not known at startup. Without some means of determining the rotor orientation, precise torque control at start-up cannot be achieved in the absence of a rotor position sensor.

SUMMARY OF THE INVENTION

It is a general object of the present invention to provide a control system and method for a sinusoidally-excited PM motor which permits precise control of machine torque.

It is a more specific object to provide a method and control system for implementing field orientation or phase angle control of a sinusoidally-excited PM motor without using a rotor position sensor.

It is another object to provide a field orientation control system for a sinusoidally-excited PM motor which overcomes the special problems of drive startup without using a rotor position sensor.

In one embodiment, there is provided a control system for a permanent magnet motor having a stationary assembly, a plurality of winding stages associated with the stationary assembly, and a permanent magnet rotor arranged in selective magnetic coupling relation with the winding stages for rotation in response to energization of the winding stages in the preselected sequence. The control system comprises monitoring means connected for sampling voltage and current supplied to the winding stages and producing signals representative thereof, a three-phase to two-phase converter means for converting the voltage and current signals to corresponding two-phase rotating vector signals, power inverter control means for selectively energizing the winding stages in a sinusoidal fashion to effect rotation of the permanent magnet rotor means, a vector rotator means responsive to DC signals representative of quadrature and direct axis current command signals and to the two-phase rotating vector components for producing two-phase ($\alpha$- and $\beta$-axis) control signals which are varying in synchronism with the two-phase vector signals, and function generating means responsive to a torque command signal for producing the direct and quadrature axis DC current command signals. The synchronously varying $=$- and $\beta$-axis signals are supplied to the power inverter control means for effecting sinusoidal energization of the permanent magnet motor. The motor is preferably an interior permanent magnet motor and the function generators convert the torque command signal into direct and quadrature current commands according to predetermined functions. The control system includes means for initially establishing a preselected amplitude of $\alpha$-axis current in the motor at start-up prior to establishing $\beta$-axis current such that the rotor is caused to become initially aligned with the selected $\alpha$-axis.

DETAILED DESCRIPTION OF THE EMBODIMENT

Figure 1:
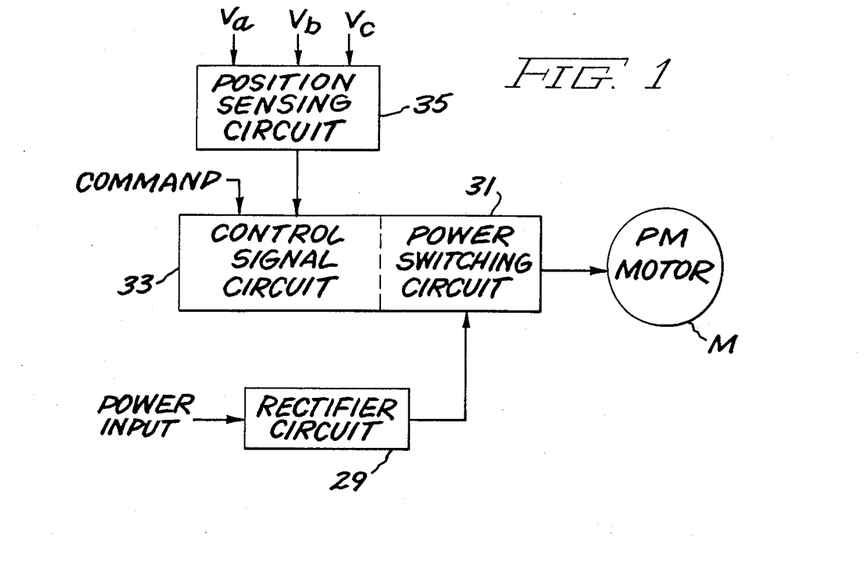
FIG. 1 is a block diagram showing the major components of a control system in combination with an electronically commutated motor.

FIG. 1 schematically illustrates a PWM motor control system which includes a permanent magnet synchronous motor M adapted to be energized from a DC power source and having (see FIG. 2) a stationary assembly including a stator or core 13 and a rotatable assembly including a permanent magnet rotor 15 and a shaft 17. The motor laminations, as shown in FIG. 3, include conventional stator laminations 19 containing winding slots 21, as typically employed, for example, in polyphase induction motors. Rotor laminations 23 are one-piece laminations mounted on a shaft through central opening 27. The rotor laminations contain slots 25 through which permanent magnets are passed, when the slots are aligned, with north and south poles of the magnets oriented as indicated by the N and S designations, respectively, in the figure. Stator 13 includes a plurality (e.g., three) of winding stages S1, S2 and S3 (FIG. 3A) adapted to be electronically commutated in at least one preselected sequence, e.g. A,B,C, although the invention is not limited to having three winding stages.

When the winding stages S1, S2, S3 are sinusoidally-energized in an appropriate temporal sequence, a radial magnetic flux is established which moves clockwise or counterclockwise around the stator bore, depending on the preselected sequence or order in which the stages are energized. This moving field intersects the magnetic flux developed by the permanent magnet rotor to cause rotor 15 to rotate relative to stator 13 in the desired direction to develop a torque which is a direct function of the intensities or strengths of the magnetic fluxes. This type of PM machine is well known to those skilled in the art of motor drives.

Further, while PM synchronous motor M is illustrated herein for purposes of disclosure, it is contemplated that other such motors of different constructions and/or different winding arrangements may be utilized in one or another form of the invention so as to meet at least some of the objects thereof.

The winding stages of motor M are commutated energized in synchronism with the rotor position by sensing the rotational position of the rotatable assembly or rotor 15, as it rotates within the bore of stator 13, and utilizing electrical voltage and current signals generated as a function of the rotational position of the rotor to sinusoidally excite the winding stages in different preselected orders or sequences that determine the direction of the rotation of the rotor. If square-wave current pulses are used to excite the motor stator windings instead of sinusoids, position sensing may be accomplished by a position-detecting circuit responsive to the back-emf of the ECM to provide a simulated signal indicative of the rotational position of the rotor to control the timed sequential application of voltage to the winding stages of the motor. Such a system is disclosed in U.S. Pat. No. 4,654,566 to Erdman, issued Mar. 31, 1987 and assigned to the assignee of the present invention. However, this scheme cannot be used if sinusoidal excitation of the motor is desired or required, and inductance of the motor of FIG. 3 is often too high (due to the extra iron above the magnets) so that the open phase voltage signal required is not available.

Referring back to FIG. 1, power supplied from a 115 V 60 Hz AC line or other suitable source is rectified by a rectifier circuit 29 which defines a DC power source and is applied to a power inverter switching circuit 31 which constitutes means for controlling application of the DC voltage to the winding stages to provide the winding stages with a resultant effective sinusoidal voltage. Power switching circuit 31 responds to a set of control signals from a control signal circuit 33 for exciting the winding stages by pulse-width modulating the DC voltage to produce a balanced three-phase sinusoidal excitation for the motor. The set of control signals produced by control signal circuit 33 are a function of rotor position which is derived from a position sensing circuit 35, selected motor parameters, and the applied torque command.

Figure 4:
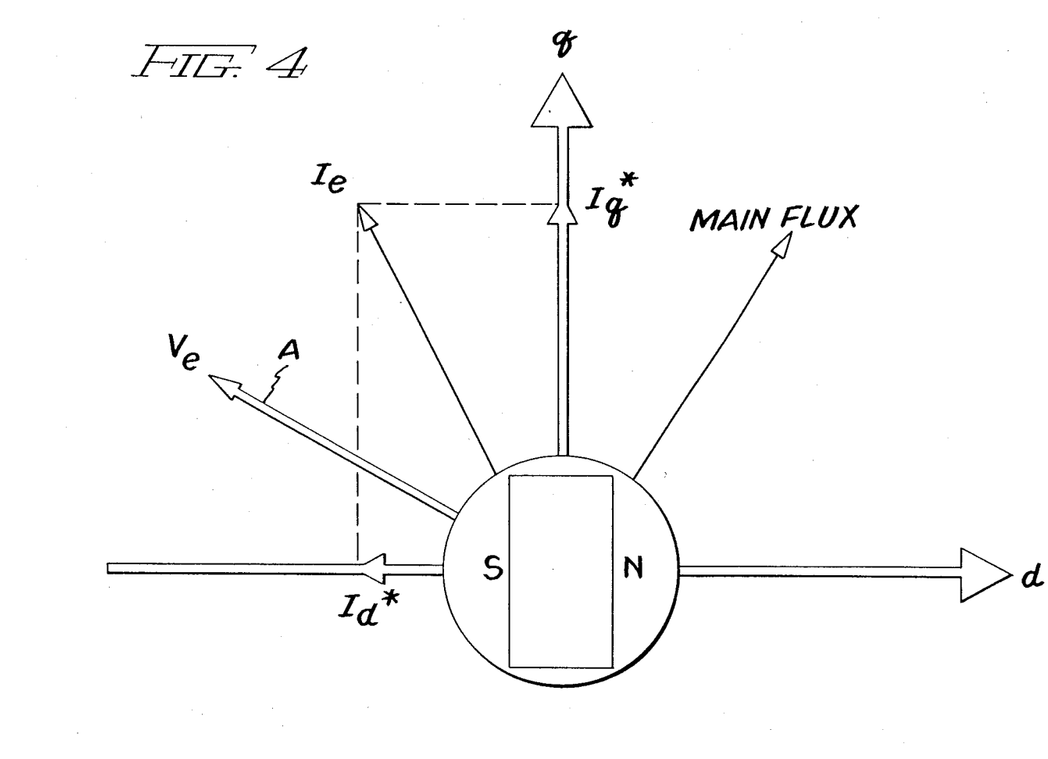
FIG. 4 is a vector diagram illustrating flux, current and voltage vectors in an interior permanent magnet motor.

The description thus far has been directed generally at control system requirements for a permanent magnet synchronous motor. More specifically, FIG. 4 illustrates a typical operating condition for an interior permanent magnet motor, and is a vectorial representation of the motor magnetic flux and the vectorially resolved motor current and voltage. The rotor is simplified to a two-pole representation with the magnets aligned along the direct or d-axis. The quadrature or q-axis is positioned to be along the axis of the no-load counter EMF. The d and q axes are derivations of the dq equivalent circuit model of a motor, an example of which is given in U.S. Pat. No. 4,245,181 to Plunkett, issued Jan. 13, 1981 and assigned to the assignee of the present invention. Under load, the voltage vector $V_e$ shifts to position A. The current vector $I_e$ lags the voltage vector $V_e$ for optimum efficiency and torque production (the vectors are shown with respect to the rotating rotor 15 so that each is essentially fixed with regard to the d-axis). The position and amplitude of the voltage vector $V_e$ can be derived from the three applied stator voltages. Since these voltages are chopped waveforms, the unfiltered $V_e$ signal tends to be chopped and noisy as well. However, a measure of the amplitude and position of the voltage vector can be developed by an integration process which filters some of the chopping-generated ripple.

Figure 5:
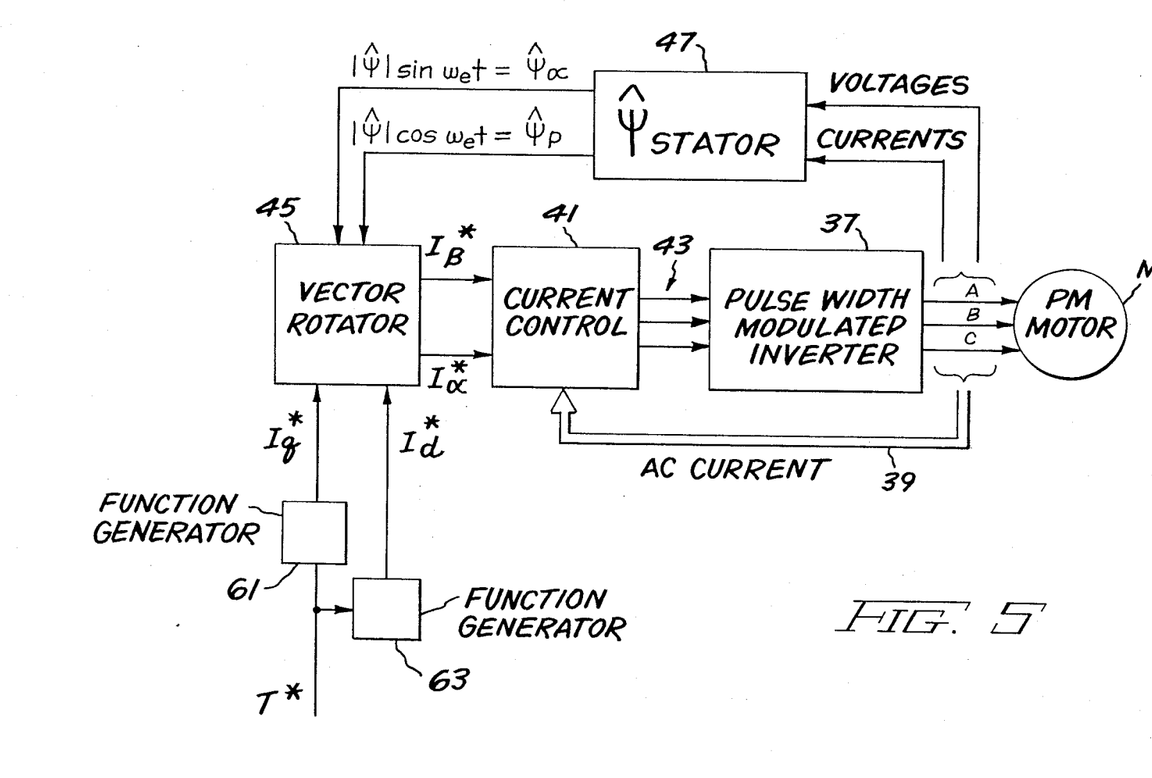
FIG. 5 illustrates in block diagram form an exemplary system for controlling an IPM motor in accordance with the present invention.

FIG. 5 is a block diagram of a control system, in accordance with the present invention, for controlling permanent magnet motor M using field orientation control techniques responsive to a torque command signal T*. In this system, motor M is driven by a sinusoidal PWM inverter 37 which applies current to the motor windings in at least one preselected sequence to effect rotation of the motor rotor. A current feedback loop 39 provides signals from motor M to a current control circuit 41. Circuit 41 provides gating signals to power switching devices (not shown) of inverter 37 in a manner to regulate current in motor M to match the commanded $i_\alpha*$ and $i_\beta*$ current values. The $\alpha$- and $\beta$-axis components represent two-phase equivalent values for the three-phase stator A, B, C phase values. A more complete description of a PWM inverter and current control circuit is given in Young U.S. Pat. No. 4,642,537, issued to the instant assignee Feb. 10, 1987, the disclosure of which is hereby incorporated by reference.

Current control circuit 41 is responsive to control signals $i_\alpha*$ and $i_\beta*$ which are AC signals sinusoidally varying at the frequency of rotation of the motor rotor and in synchronism therewith. These control signals are effective to cause generation of the gating signals on lines 43 in the appropriate sequence to energize the switches within inverter 37. Signals $I_\alpha*$ and $I_\beta*$ are generated by a vector rotator 45, which converts direct and quadrature axis current commands $I_d*$ and $I_g*$ into rotating or AC quantities in response to $|\psi|$ sin $\omega_e t$ and $|\psi|$ cos $\omega_e t$ signals referred to subsequently as $\psi_\alpha$ $\omega_\beta$, respectively. The excitation frequency $\omega_e$ is related to the rotor frequency (speed) $\omega_r$ according to $\omega_e = P/2$ $\omega_r$ where P is the number of motor poles. The $\psi_\alpha$ and $\psi_\beta$ signals represent the stator flux vector signals obtained by integration of motor terminal voltage and current. A stator flux vector integrator circuit 47 generates the flux vector signal $\psi_\alpha$ and $\psi_\beta$ from measured terminal voltage and current of the motor. A more detailed description of vector rotators and flux integrators may be had by reference to L. Garces U.S. patent application Ser. No. 839,203 filed Mar. 13, 1986, now U.S. Pat. No. 4,677,360 issued June 30, 1987 and assigned to the present assignee. Another description may be obtained by reference to U.S. Pat. No. 4,388,577 issued June 14, 1983.

Figure 6:
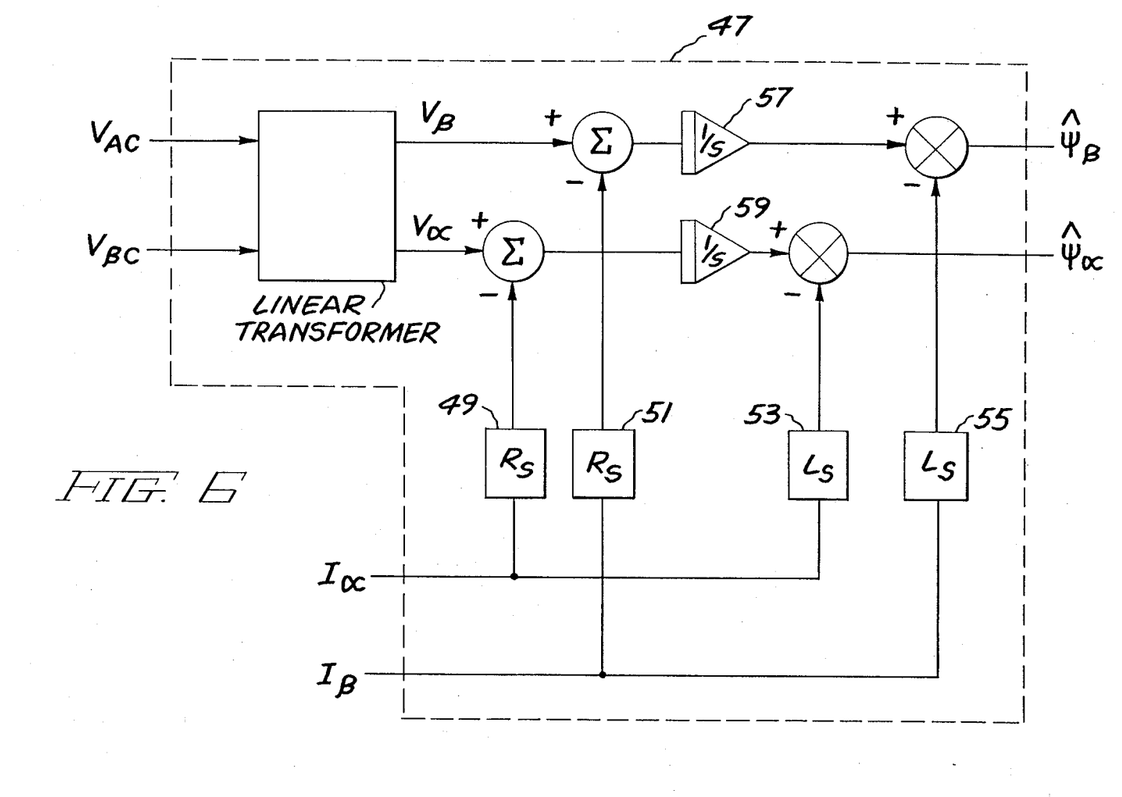
FIG. 6 is a simplified block diagram of one circuit for generating estimates of the flux vectors in an IPM motor.

One form of flux vector generator circuit 47 is shown in FIG. 6. The input signals are measured values of terminal voltages $V_{AC}$ and $V_{BC}$ and currents $I_\alpha$ and $I_\beta$ obtained in a manner well known in the art. The voltages $V_{AC}$ and $V_{BC}$ are linearly transformed to vector quantities $V_\alpha$ and $V_\beta$ by well-known means. The circuit values Rs and Ls of blocks 49, 51,53 and 55 are representative of measured values of stator resistance and inductance. The $I_\alpha$ and $I_\beta$ signals are effected by these values (in the circuitry of FIG. 6 as well as in motor M of FIG. 5) before being summed with the $V_\alpha$ and $V_\beta$ signals. Integrators 57 and 59 integrate the composite signals $(V_\alpha - I_\alpha Rs)$ and $(V_\beta - V_\beta Rs)$ prior to further summation with signals $I_\alpha$ Ls and $I_\beta$ Ls for producing $\psi_\alpha$ and $\psi_\beta$, the estimated flux signals in the quadrature and direct axes of the stator of motor M. The measured voltages and currents are sine and cosine quantities as are the flux signals, whenever the rotor is rotating.

Figure 7:
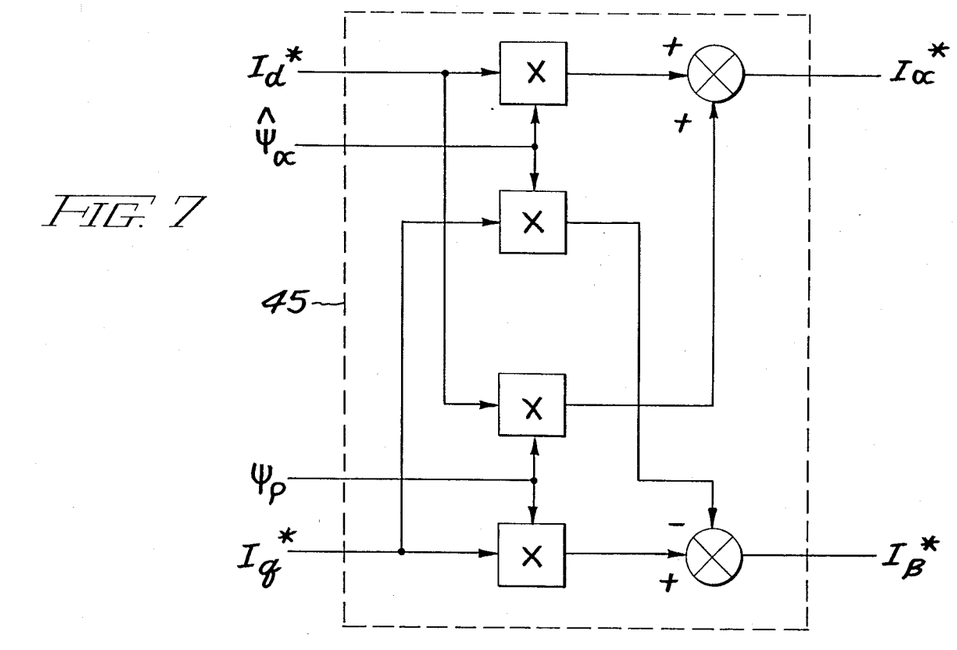
FIG. 7 is a simplified block diagram of one circuit for converting current command signals to rotating vector signals synchronized to a motor.

The estimated flux signals are used in vector rotator 45 of FIG. 5, shown in detail in FIG. 7. Here the direct and quadrature current command signals (DC quantities) are multiplied by the rotating flux signals $\psi_\alpha$ and $\psi_\beta$ (rotating quantities) to obtain the $I_\alpha*$ and $I_\beta*$ command signals referred to with respect to FIG. 5.

In operation, at no load the $\psi_\alpha$ and $\psi_\beta$ signals are sine waves such that $\psi_\alpha$ is a maximum when the rotor magnet is aligned with the stator phase A winding axis. As load is applied, the $\psi_\alpha$ and $\psi_\beta$ signals shift in angle similar to the total internal flux of the motor. When applied to the vector rotator 45, shown in FIG. 5, these signals synchronize inverter 37 to motor M. The current command signals $I_d^*$ and $I_g^*$ are DC signals which control amplitude of the component of motor current aligned with the rotor magnet flux and the perpendicular quadrature component.

Figure 8:
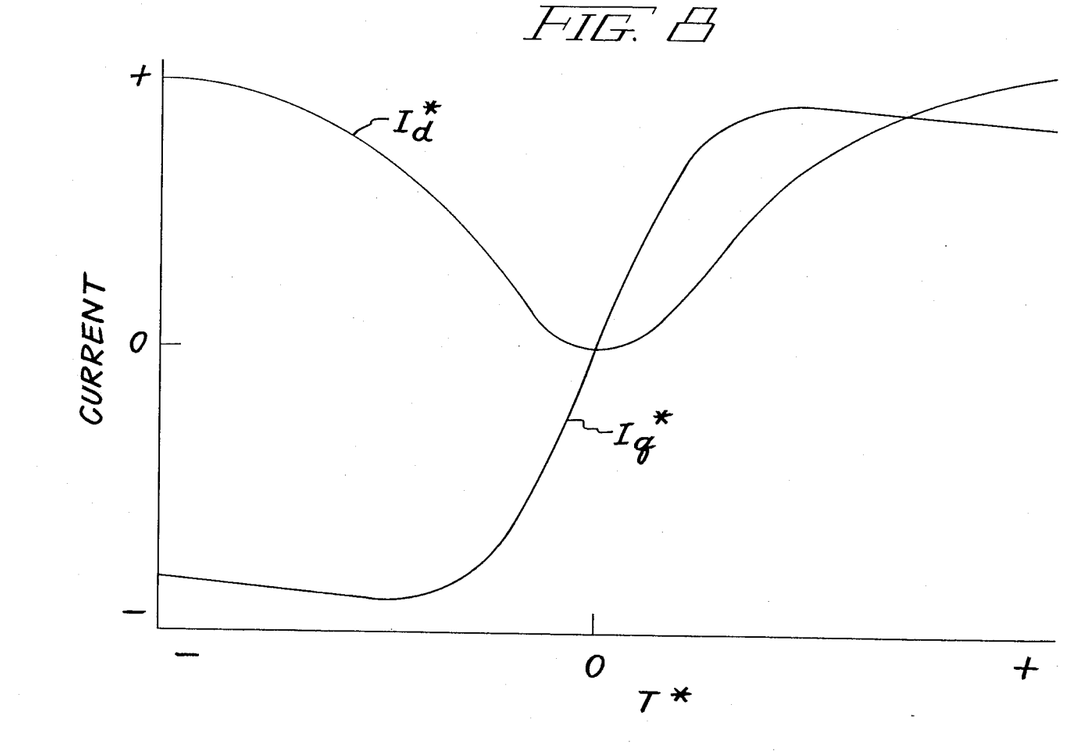
FIG. 8 illustrates exemplary waveforms of the relationships between commanded torque T* and commanded d- and q-axis stator currents ($I_d$* and $I_g$*) executed by function generators 61 and 63 in the system of FIG. 5.

FIG. 8 illustrates typical examples of the relationship between the commanded torque $T_e^*$ and the current component commands $I_g^*$ and $I_d^*$ executed by function generators 61 and 63, respectively. These functional relationships are selected to optimize some aspect of motor drive performance, such as enforcing unity power factor operation or minimizing the required stator current for each torque command value $T_e^*$. These functional relationships necessarily reflect the parameters of the PM motor M. The particular functions illustrated in FIG. 8 are appropriate for an interior permanent magnet machine in which the magnets are buried inside the iron rotor structure.

In order to initiate rotation of the system of the present invention, a dc current is initially applied to the motor in the $\alpha$ axis, i.e., only an $I_\alpha$ component of current is supplied. The magnitude of current $I_\alpha$ is sufficient to cause the rotor to move into its preferred alignment with the applied stator field. After the $I_\alpha$ current is applied for sufficient time to permit rotor alignment, inverter 37 is energized to command current to ramp up in the $\beta$ axis which generates a rotating MMF excitation wave in the airgap, producing torque and initiating rotor rotation. As soon as the motor begins rotating, the magnets begin generating back-emf voltages which can be sensed as terminal voltages, allowing the flux calculator circuit 47 in FIG. 5 to begin normal running operation. This method allows the motor to be self-aligning without prior knowledge of rotor position.

What has been described is a method and system for controlling a permanent magnet motor and, in particular, an interior permanent magnet motor using a field orientation control system, without a position sensor, which automatically synchronizes operation of an inverter to the motor rotor position for start-up and thereafter compensates for non-linear response of the motor to changes in torque commands. While the system has been described in what is presently considered to be a preferred embodiment, other variations and modifications will become apparent to those skilled in the art. Accordingly, it is intended that the invention be interpreted within the full spirit and scope of the appended claims.

What I claim is:

1. A control system for a permanent magnet motor having a stationary assembly, a plurality of winding stages associated with the stationary assembly and adapted to be energized in at least one preselected sequence and a permanent magnet rotor arranged in selective magnetic coupling relation with the winding stages for rotation in response to energization of the winding stages in the preselected sequence, the control system comprising monitoring means connected for sampling voltage and current supplied to the winding stages and producing signals representative thereof, three-phase to two-phase converter means for converting the voltage and current signals to corresponding two-phase rotating vector components, power inverter control means for selectively energizing the winding stages in a sinusoidal fashion to effect the rotation of the permanent magnet rotor, vector rotator means responsive to DC signals representative of quadrature and direct axis current command signals and to the two-phase rotating vector components for producing two-phase $\alpha$ and $\beta$ control signals from the DC signals, said two-phase control signals varying in synchronism with the two-phase vector components, and function generating means responsive to a torque command signal for producing the direct and quadrature axis DC current command signals, the synchronously-varying two-phase control signals being applied to said power inverter control means for effecting the energization of the winding stages.

2. The control system of claim 1 wherein said motor comprises an interior permanent magnet motor.

3. The control system of claim 2 wherein said function generating means convert said torque command signal into current commands according to a predetermined function selected to optimize an aspect of drive system performance.

4. The control system of claim 3 wherein said aspect of drive system performance selected for optimization comprises unity power factor operation.

5. The control system of claim 3 wherein said aspect of drive system performance selected for optimization comprises maximum torque per ampere of stator current.

6. The control system of claim 3 and including means for establishing a preselected amplitude of direct axis current in said motor at start-up prior to establishing quadrature axis current in a ramped fashion.

7. The control system of claim 3 wherein the current commands by function converted the generating means are configured to generate the lowest possible stator current amplitude for each value of torque command.

8. A method for controlling an interior permanent magnet motor having a stationary assembly, a plurality of winding stages associated with the stationary assembly and adapted to be energized in at least one preselected sequence, and a permanent magnet rotor arranged in selective magnetic coupling relation with the winding stages for rotation in response to energization of the winding stages in the preselected sequence, and power control means coupled to the motor for supplying energization thereto, the method comprising the steps of:

sampling voltage and current supplied to the winding stages and producing signals representative thereof;

converting the voltage and current representative signals to corresponding two-phase rotating vector signals;

receiving a torque command signal;

converting the torque command signal to corresponding quadrature and direct axis current command signals;

combining the two-phase rotating vector signals with the current command signals for generating rotating current command signals in synchronism with rotation of the motor rotor; and applying the rotating current command signals to the power control means for effecting energization of the motor winding stages in the preselected sequence.

9. The method of claim 8 and including the steps of:

energizing the motor with direct axis current for a predetermined minimum time prior to application of quadrature axis current to effect start-up of the motor with controlled torque.

* * * * *